United States Patent [19]
Nakagawa

[11] Patent Number: 6,144,635
[45] Date of Patent: Nov. 7, 2000

[54] ASYNCHRONOUS TRANSFER MODE EXCHANGE SYSTEM

[75] Inventor: Tatsuo Nakagawa, Tokyo, Japan

[73] Assignee: NEC Corporation, Tokyo, Japan

[21] Appl. No.: 08/896,025

[22] Filed: Jul. 17, 1997

[30] Foreign Application Priority Data

Jul. 18, 1996 [JP] Japan ................................ 8-189114

[51] Int. Cl.[7] .................................................. H04L 12/56
[52] U.S. Cl. ........................................ 370/229; 370/395
[58] Field of Search .................................. 370/229, 230,
370/231, 232, 233, 234, 235, 236, 395,
411, 412, 413, 414, 415, 416, 417, 418,
252, 241

[56] References Cited

U.S. PATENT DOCUMENTS

| | | | |
|---|---|---|---|
| 5,455,820 | 10/1995 | Yamada ..................................... | 370/413 |
| 5,550,823 | 8/1996 | Irie et al. .................................. | 370/413 |
| 5,768,257 | 6/1998 | Khacherian et al. .................... | 370/229 |
| 5,787,072 | 7/1998 | Shimojo et al. ......................... | 370/235 |
| 5,790,522 | 8/1998 | Fichou et al. ............................ | 370/413 |
| 5,838,677 | 11/1998 | Kozaki et al. ............................ | 370/235 |
| 5,864,553 | 1/1999 | Aramaki ................................... | 370/413 |
| 5,867,663 | 2/1999 | McClure et al. ......................... | 370/413 |

FOREIGN PATENT DOCUMENTS

| | | |
|---|---|---|
| 3-230641 | 10/1991 | Japan . |
| 7-177179 | 7/1995 | Japan . |

*Primary Examiner*—Dang Ton
*Attorney, Agent, or Firm*—Foley & Lardner

[57] ABSTRACT

An asynchronous (ATM) exchange system comprises a plurality of input buffers each for receiving data cells from an input cell highway to temporarily store the data cells, a plurality of output buffers each for temporarily storing data cells to transmit the data cells to an output cell highway, and an array of ATM switches each for transferring data cells from one of the input buffers to one of the output buffers. The amount of data cells stored in each output buffer is monitored by an output buffer monitor and used for controlling the transfer rate of the data cells from each input buffers, thereby increasing durability of the ATM exchange system against a burst signal or buffer congestion.

6 Claims, 4 Drawing Sheets

ASYNCHRONOUS TRANSFER MODE EXCHANGE SYSTEM

BACKGROUND OF THE INVENTION (a) Field of the Invention

The present invention relates to an asynchronous transfer mode (ATM) exchange system and, more particularly, to an improvement in controlling the transfer rate of the ATM exchange system for avoiding congestion of the output buffer.

(b) Description of the Related Art

In a conventional ATM exchange system, RNR (Receive Not Ready) or BP (Backpressure) method is generally used, wherein a data traffic control is effected by using ON/OFF control or a time scheduling control for avoiding duplicated transfer of data cells to a single output cell highway. A first conventional technique for controlling an ATM exchange systems described in JP-A-3(1991)-230641. FIG. 1 shows the first conventional ATM exchange system described in the publication, wherein the ATM exchange system comprises an input buffer section 100 including a plurality of input buffers 11 (n input buffers, although two of them are shown in the figure) each receiving input data from an input cell highway 16, an output buffer section 200 including n output buffers 12 each for transmitting data through an output cell highway 17, and an ATM exchange module 13 or array of ATM switches interposed between the input buffer section and output buffer section for effecting RNR control.

Each input buffer 11 has n input buffer elements 21 each corresponding to one of the output buffers 12. Each input buffer element 21 of the input buffer 11 has a FIFO (first-in-first-out) function for transfer of the stored data cells to the corresponding output buffer 12. The input buffer section 100 also comprises a cell output stopper 15 for each input buffer 11 for stopping cell transfer from the input buffer element 21 to an output buffer 12 which is in congestion, i.e., temporarily stores large amount of data cells. The output buffer section also includes a buffer threshold monitor 14 for each output buffer 12.

Each buffer threshold monitor 14 functions for monitoring the corresponding output buffer 12 as to whether or not the amount of data cells stored in the output buffer 12 exceeds a buffer threshold, and feeds a congestion signal or RNR signal to each cell output stopper 15 when the amount of stored data cells in the corresponding output buffer 12 exceeds the threshold. In this configuration, if the ATM exchange system operates in a state where a particular output buffer operates over the buffer threshold, e.g., if a burst traffic is generated in the ATM exchange system in connection with the particular output buffer 12, the input buffer elements 21 associated with the particular output buffer 12 are stopped by RNR signals.

In the first conventional ATM exchange system using the RNR control method, if the amount of cells stored in an output buffer 12 remains in the vicinity of the buffer threshold and yet the amount of the data cells being transferred from the input buffer 11 is substantially equal to the amount of the data cells transmitted from the output buffer 12, the RNR signal suppresses the amount of data cells transferred from the input buffer 11 to the output buffer 12, thereby lowering the throughput of the ATM exchange switch.

It may be considered that a threshold for restarting of data transfer is separately determined from the threshold for stopping data transfer to have a hysteresis. However, it only results in the increase of the interval of the stopping of the data transfer for the time corresponding to the difference between the thresholds, and remains substantially in a similar situation.

FIG. 2 shows a second conventional ATM exchange system using a time scheduling method. The ATM exchange system comprises a plurality of input buffers 11, a plurality of output buffers 12, and an ATM switch module 13 which are similar to those of the first conventional ATM exchange system. The ATM exchange system of FIG. 2 comprises a timing control section 18 which generates a data transfer stop signal depending on the monitored signal supplied from each input buffer 11, and a cell output control section 19 disposed for each of input buffers 11 for stopping data transfer from the input buffer 11 responsive to the data transfer stop signal.

In the second conventional ATM exchange system, the timing control section 18 must control timing among all inputs of the ATM exchange module 13. Namely, the timing control must be effected at a rate in accordance with the switching rate of the ATM exchange module 13, which is in fact extremely difficult. This is because the time scheduling operation must be based on the state of each input buffer 11, i.e., amount of the data cells stored in each input buffer 11, and accordingly, a central control must be employed in the timing control section 18 to schedule data transfers from all of the input buffers 11.

SUMMARY OF THE INVENTION

It is therefore an object of the present invention to provide an ATM exchange system for an ATM network, which is capable of controlling data transfer at a rate corresponding to the transfer rate of the output buffers for avoiding a signal congestion in an output buffer.

The present invention provides an asynchronous transfer mode (ATM) exchange system comprising a plurality of input buffers each for receiving data cells from an input cell highway to store the data cells for awhile, a plurality of output buffers each for storing data cells for a while to transmit the data cells to an output cell highway, an array of ATM switches each for transferring the data cells from a corresponding one of the input buffers to a corresponding one of the output buffers, an output buffer monitor circuit for monitoring the amount of data cells stored in each of the output buffers to generate a cell amount signal representing the amount of data cells stored in the each of the output buffers, and a cell output control circuit for receiving the cell amount signal to control a transfer rate of the data cells transferred from the input buffer based on the cell amount signal.

In accordance with the present invention, the transfer rate of each input buffer is controlled by the amount of the data cells stored in the corresponding output buffer. Accordingly, data transfer from the input buffer can follow the actual state of the output buffer, which prevents the congestion of the output buffer resulting from a burst signal.

The above and other objects, features and advantages of the present invention will be more apparent from the following description, referring to the accompanying drawings.

DESCRIPTION OF THE PREFERRED EMBODIMENTS

Figure 1:
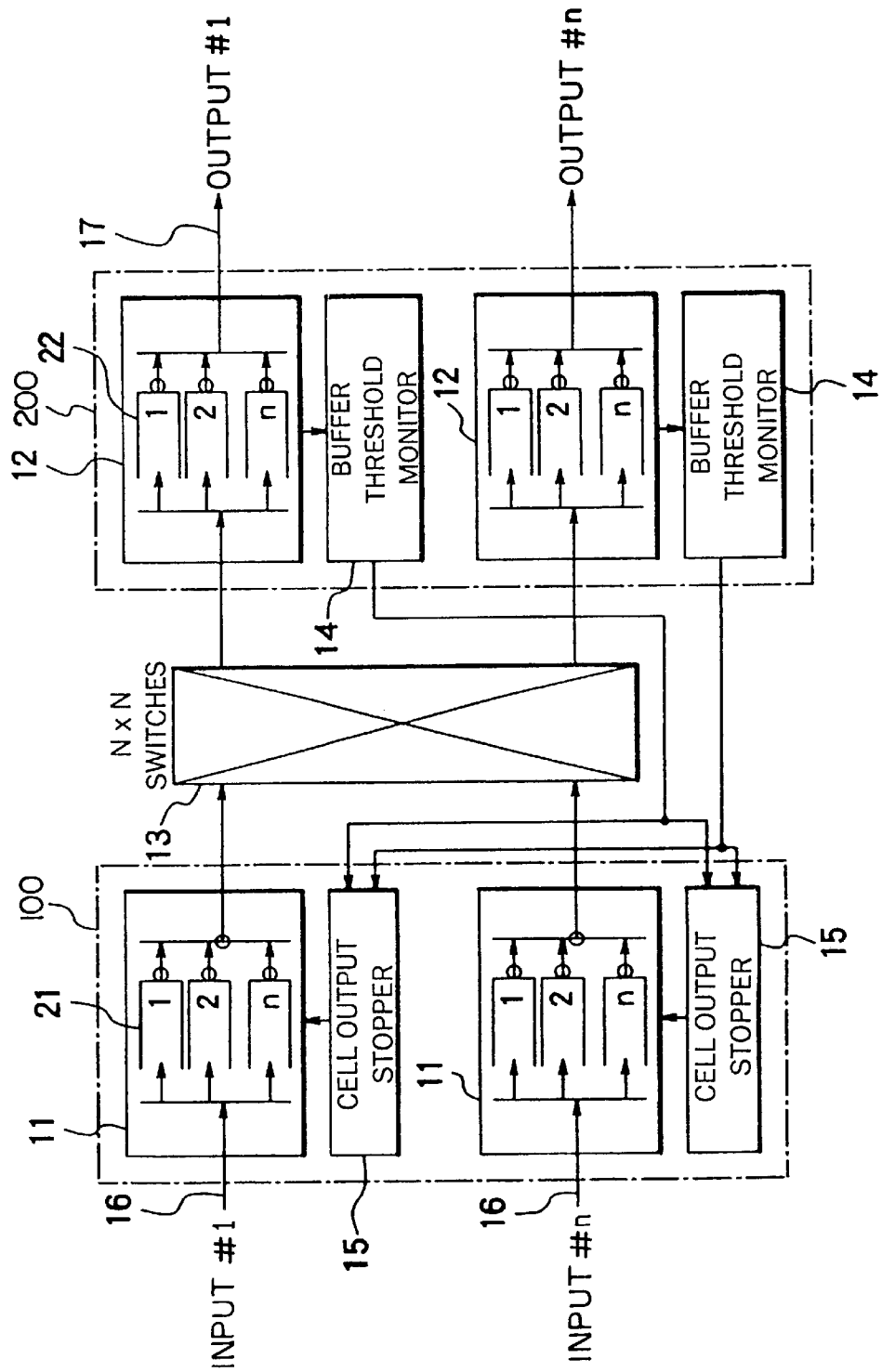
FIG. 1 is a block diagram of a first conventional ATM exchange system.
Figure 2:
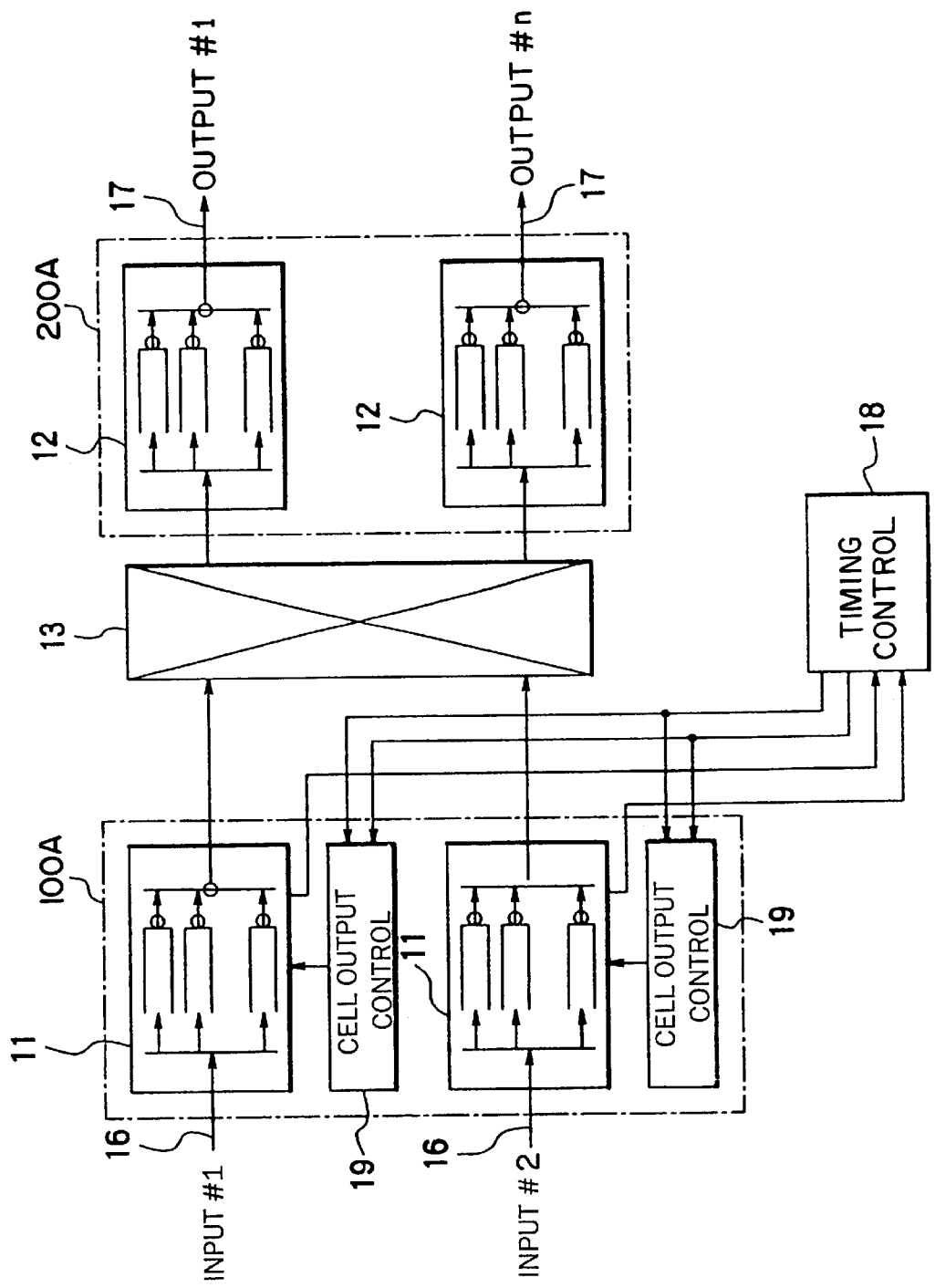
FIG. 2 is a block diagram of a second conventional ATM exchange system.

Now, the present invention is more specifically described with reference to accompanying drawings, wherein similar constituent elements are designated by the same or similar reference numerals throughout the drawings.

Figure 3:
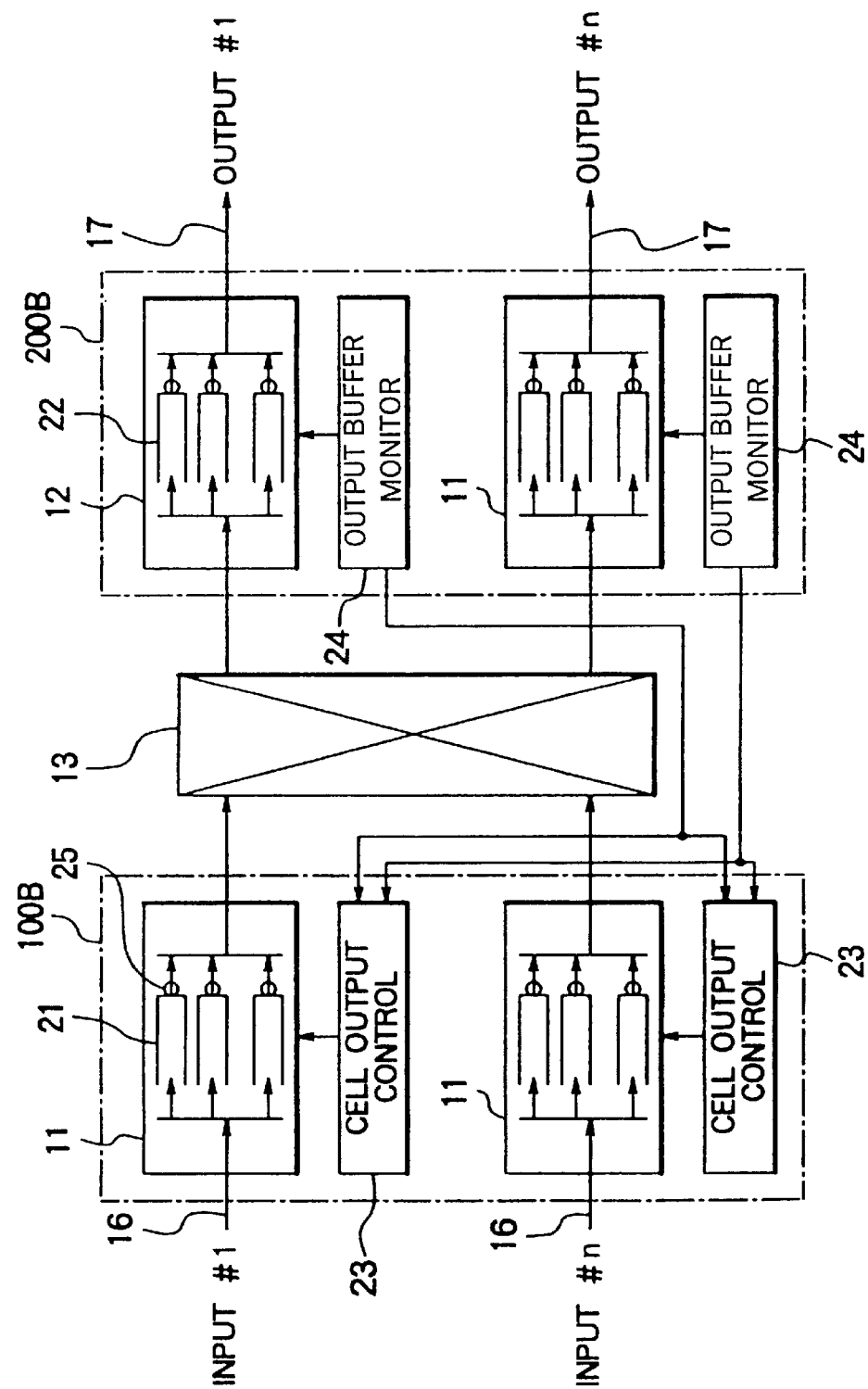
FIG. 3 is a block diagram of an ATM exchange system according to first and second embodiments of the present invention.

Referring to FIG. 3, the ATM exchange system according to a first embodiment (and also a second embodiment) of the present invention comprises an input buffer section 100B, output buffer section 200B, and an ATM exchange module 13 or array of ATM switches for data transfer from the input buffer section 100B to the output buffer section 200B. The input buffer section 100B has a plurality of (n) input buffers 11 each corresponding to one of input cell highways 16, and a plurality of (n) cell output controllers 23 each corresponding to one of the input buffers 11.

The output buffer section 200B comprises a plurality of (n) output buffers 12 each corresponding to one of output cell highways 17, and a plurality of output buffer monitors 24 each corresponding to one of the output buffers 12. Each input buffer 11 has n input buffer elements 21 each corresponding to one of the output buffers 12, and a traffic shaper or traffic shaping circuit 25 disposed for each of the input buffers 11 for shaping data cells stored in the input buffer 11. Each output buffer 12 has n output buffer elements 22 each corresponding to one of the input buffers 11. The ATM exchange module 13 includes n×n ATM switches each corresponding one of input buffer elements 21 or one of output buffer elements 22.

Each input buffer temporarily stores data cells supplied from the corresponding input cell highway 16 in one of the input buffer elements 21 corresponding to one of the output buffers 12 specified by the data transfer. Each output buffer 12 temporarily stores data cells supplied from the corresponding input buffer elements 21 and delivers the stored data cells to the corresponding output cell highway 17 at the transfer rate of the output cell highway.

In the first embodiment of the present invention, each output buffer monitor 24 monitors the amount of data cells stored in each output buffer element 22 of the corresponding output buffer 12 to generate a cell amount signal representing a combination of the specified output buffer element 22 and the amount of data cells stored therein. Each cell output controller 23 receives the cell amount signal from the output buffer monitor 24 to control the transfer rate of the data cells, to be transferred from the corresponding input buffer element 21 specified by the cell amount signal, in accordance with the amount represented by the cell amount signal. By this configuration, each input buffer element 21 can be controlled in its transfer rate in accordance with the amount of data cells stored in the corresponding output buffer element 22, thereby increasing durability against a burst signal or buffer congestion occurring sometimes in the system. Specifically, the transfer rate of the input buffer element 21 may be controlled in inverse proportion to the amount of data cells stored in the output buffer element 22 or may be controlled by other suitable relationship.

In a second embodiment of the present invention, which is also shown in FIG. 3, each output buffer monitor 24 monitors the amount of data cells stored in the output buffer 12 as a whole and differentiates the same to obtain the state of increase or decrease of data cells stored in each output buffer 12, to thereby generate an UP/DOWN signal corresponding to the increase/decrease of the amount of data cells stored in the each output buffer 12. Each cell output controller 23 in the input buffer section 100B receives the UP/DOWN signal to control the transfer rate of the corresponding input buffer element 21 so that the transfer rate is increased by one step if the UP/DOWN signal represents a decrease of the amount of data cells stored in the output buffer 12 and is decreased by one step if the UP/DOWN signal represents an increase of the amount of data cells stored in the output buffer 12.

Figure 4:
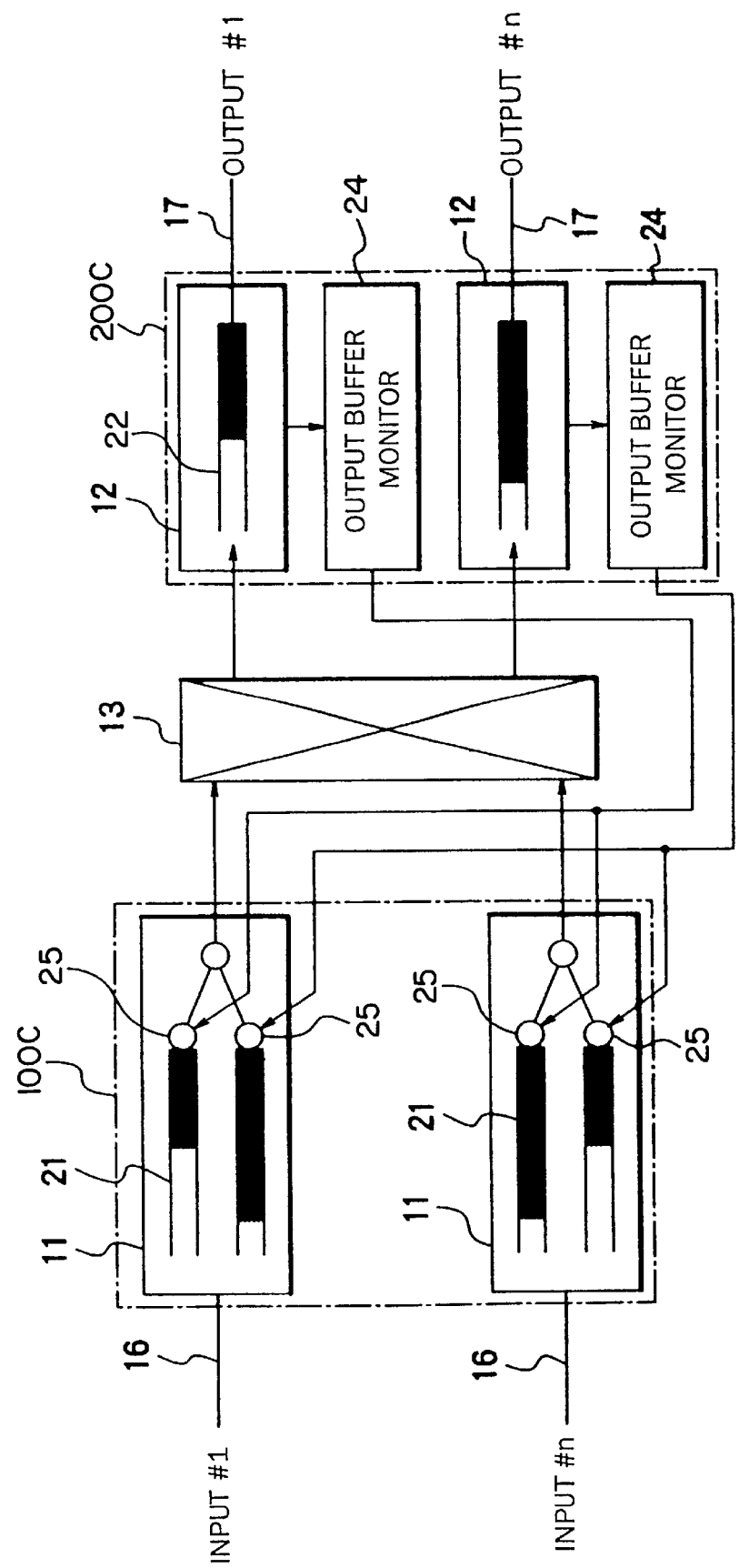
FIG. 4 is a schematic block diagram of an ATM exchange system according to a third embodiment of the present invention.

Referring to FIG. 4 showing a third embodiment of the present invention, the ATM exchange system has a configuration similar to that of the ATM exchange system according to the first embodiment shown in FIG. 3 except that the output buffer monitor 24 supplies the cell amount signal representing the amount of data cells stored in the output buffer 12 to the traffic shaper 25 provided on the output of each input buffer element 21, to thereby control the transfer rate of the input buffer element 21 based on the amount of data cells stored in the output buffer 12. By this configuration, the transfer rate of each input buffer element 21 is controlled in accordance with the amount of data cells stored in the corresponding output buffer 12, similarly to the second embodiment.

Since the above embodiments are described only for examples, the present invention is not limited to the above embodiments and various modifications or alterations can be easily made therefrom by those skilled in the art without departing from the scope of the present invention.

What is claimed is:

1. An asynchronous transfer mode (ATM) exchange system comprising:

a plurality of input buffers each for receiving data cells from an input cell highway to temporarily store the data cells;

a plurality of output buffers each for temporarily storing data cells to transmit the data cells to an output cell highway;

an array of ATM switches each for transferring the data cells from a corresponding one of said input buffers to a corresponding one of said output buffers;

an output buffer monitor circuit for monitoring the amount of data cells stored in each of said output buffers to generate a cell amount signal representing the amount of data cells stored in the each of said output buffers; and a cell output control circuit for receiving said cell amount signal to control a transfer rate of the data cells transferred from said input buffers based on said cell amount signal, wherein said cell output control circuit increases and decreases the transfer rate of each of said input buffers in accordance with a decrease or increase of the amount of data cells stored in a corresponding one of said output buffers.

2. An asynchronous transfer mode exchange system comprising:

a plurality of input buffers each for receiving data cells from an input cell highway to temporarily store the data cells;

a plurality of output buffers each for temporarily storing data cells to transmit the data cells to an output cell highway;

an array of ATM switches each for transferring the data cells from a corresponding one of said input buffers to a corresponding one of said output buffers;

an output buffer monitor circuit for monitoring the amount of data cells stored in each of said output buffers to generate a cell amount signal representing the amount of data cells stored in the each of said output buffers; and a cell output control circuit for receiving said cell amount signal to control a transfer rate of the data cells transferred from said input buffers based on said cell amount signal, wherein the cell output control circuit controls the transfer rate of the data cells in the corresponding one of said input buffers in accordance with an inverse proportion of the amount of data cells stored in the corresponding one of said output buffers, as obtained from said cell amount signal.

3. An ATM exchange system as defined in claim 2, wherein, when the amount of data cells stored in the corresponding one of said output buffers decreases based on information obtained from said cell amount signal, the transfer rate of the data cells output from the corresponding one of said input buffers increases, and wherein, when the amount of data cells stored in the corresponding one of said output buffers increases based on information obtained from said cell amount signal, the transfer rate of the data cells output from the corresponding one of said input buffers decreases.

4. An ATM exchange system as defined in claim 3, wherein an amount of increase of data cells stored in the corresponding one of said cell output buffers, as determined from comparing information in said cell amount signal at a first time and said cell amount signal at a second time later than the first time, is the same as an amount of decrease in the transfer rate of the data cells output from the corresponding one of said input buffers, as controlled by said cell output control circuit.

5. An ATM exchange system as defined in claim 4, wherein an amount of decrease of data cells stored in the corresponding one of said cell output buffers, as determined from comparing information in said cell amount signal at a third time and said cell amount signal at a fourth time later than the third time, is the same as an amount of increase in the transfer rate of the data cells output from the corresponding one of said input buffers, as controlled by said cell output control circuit.

6. An asynchronous transfer mode (ATM) exchange system comprising:

a plurality of input buffers each for receiving data cells from an input cell highway to temporarily store the data cells;

a plurality of output buffers each for temporarily storing data cells to transmit the data cells to an output cell highway;

an array of ATM switches each for transferring the data cells from a corresponding one of said input buffers to a corresponding one of said output buffers;

an output buffer monitor circuit for monitoring the amount of data cells stored in each of said output buffers to generate a cell amount signal representing the amount of data cells stored in the each of said output buffers; and a cell output control circuit for receiving said cell amount signal to control a transfer rate of the data cells transferred from said input buffers based on said cell amount signal, wherein said cell amount signal is outputted periodically by said output buffer monitor circuit irrespective as to whether or not any of said input buffers are outputting data to any of said output buffers.

* * * * *